United States Patent
Li et al.

(10) Patent No.: US 10,638,434 B2
(45) Date of Patent: Apr. 28, 2020

(54) METHOD AND USER EQUIPMENT FOR TRANSMITTING DATA

(71) Applicant: NOKIA TECHNOLOGIES OY, Espoo (FI)

(72) Inventors: Bingzhao Li, Beijing (CN); Dandan Zhang, Beijing (CN); Kun Yan, Shenzhen (CN); Yongqiang Gao, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/486,593

(22) Filed: Sep. 15, 2014

(65) Prior Publication Data
US 2015/0003419 A1  Jan. 1, 2015

Related U.S. Application Data

(63) Continuation of application No. PCT/CN2013/071294, filed on Feb. 2, 2013.

(30) Foreign Application Priority Data

Mar. 14, 2012  (CN) .......................... 2012 1 0066413
Sep. 19, 2012  (CN) .......................... 2012 1 0349037

(51) Int. Cl.
*H04W 52/48* (2009.01)
*H04W 52/40* (2009.01)
(Continued)

(52) U.S. Cl.
CPC .......... *H04W 52/48* (2013.01); *H04B 7/0404* (2013.01); *H04B 7/0413* (2013.01);
(Continued)

(58) Field of Classification Search
None
See application file for complete search history.

(56) References Cited

U.S. PATENT DOCUMENTS 8,665,817 B2 *  3/2014  Seo ........................ H04B 7/024
                                                           370/330
9,380,490 B2 *  6/2016  Akkarakaran ........ H04L 5/0044
(Continued)

FOREIGN PATENT DOCUMENTS

CN    101426229 A    5/2009
CN    101677454 A    3/2010
(Continued)

OTHER PUBLICATIONS

"3rd Generation Partnership Project; Technical Specification Group Radio Access Network; Radio Resource Control (RRC); Protocol specification (Release 11)," 3GPP TS 25.331, V11.0.0, 3rd Generation Partnership Project, Valbonne, France (Dec. 2011).
(Continued)

*Primary Examiner* — Steve R Young
(74) *Attorney, Agent, or Firm* — Squire Patton Boggs (US) LLP

(57) ABSTRACT

Embodiments of the present invention provide a method and user equipment for transmitting data. The method includes: determining indication information used for indicating to the user equipment (UE) to use a dual stream mode to transmit data; and determining, according to the indication information and a transmission mode determining condition, a transmission mode used for transmitting data, where the transmit mode is a single stream mode or the dual stream mode. By using the method and user equipment for transmitting data in the embodiments of the present invention, a transmission mode is flexibly selected based on a transmission mode determining condition, and data transmission can
(Continued)

100

Determine indication information used for indicating to the UE to use a dual stream mode to transmit data ── S110

Determine, according to the indication information and a transmission mode determining condition, a transmission mode used for transmitting data, where the transmission mode is a single stream mode or the dual stream mode ── S120 be implemented at higher efficiency by combining advantages of the dual stream mode and the single stream mode.

5 Claims, 7 Drawing Sheets

(51) Int. Cl.
*H04W 36/16* (2009.01)
*H04B 7/06* (2006.01)
*H04B 7/0404* (2017.01)
*H04B 7/0413* (2017.01)

(52) U.S. Cl.
CPC ........ *H04B 7/0689* (2013.01); *H04W 36/165* (2013.01); *H04W 52/40* (2013.01)

(56) References Cited

U.S. PATENT DOCUMENTS

| | | | |
|---|---|---|---|
| 2011/0075634 A1* | 3/2011 | Maruyama | H04W 36/0055 370/331 |
| 2011/0243100 A1* | 10/2011 | Ball | H04B 7/0689 370/335 |
| 2012/0002624 A1 | 1/2012 | Li et al. | |
| 2012/0044798 A1 | 2/2012 | Yan et al. | |
| 2012/0281642 A1* | 11/2012 | Sambhwani | H04W 52/16 370/329 |
| 2013/0136090 A1* | 5/2013 | Liu | H04L 1/0002 370/329 |
| 2013/0143578 A1* | 6/2013 | Lekutai | H04W 36/0083 455/444 |
| 2013/0195044 A1* | 8/2013 | Pelletier | H04W 72/04 370/329 |
| 2013/0308589 A1* | 11/2013 | Liu | H04B 7/0628 370/329 |
| 2014/0226735 A1* | 8/2014 | Zhang | H04B 7/0452 375/260 |

FOREIGN PATENT DOCUMENTS

| | | |
|---|---|---|
| CN | 102077502 B | 4/2013 |
| JP | 2009141632 A | 6/2009 |
| WO | WO 2009147940 A1 | 12/2009 |
| WO | WO 2010102443 A1 | 9/2010 |
| WO | WO 2013010467 A1 | 1/2013 |

OTHER PUBLICATIONS

"3$^{rd}$ Generation Partnership Project; Technical Specification Group Radio Access Network; Medium Access Control (MAC) protocol specification (Release 11)," 3GPP TS 25.321, V11.0.0, 3$^{rd}$ Generation Partnership Project, Valbonne, France (Dec. 2011).

"Design Aspects of Data Channels for UL MIMO," 3GPP TSG RAN WG1 Meeting #68, Dresden, Germany, R1-120602, pp. 1-5, 3$^{rd}$ Generation Partnership Project, Valbonne, France (Feb. 6-10, 2012).

"UL MIMO H-ARQ Scheme Design," 3GPP TSG RAN WG1 Meeting #68, Dresden, Germany, R1-120659, 3$^{rd}$ Generation Partnership Project, Valbonne, France (Feb. 6-10, 2012).

"3$^{rd}$ Generation Partnership Project; Technical Specification Group Radio Access Network; Radio Resource Control (RRC); Protocol specification(Release 9)," 3GPP TS 25.331, V9.4.0, 3$^{rd}$ Generation Partnership Project, Valbonne, France (Sep. 2010).

"Initial considerations on the design for UL MIMO for HSUPA," 3GPP TSG RAN WG1 Meeting #63bis, Dublin, Ireland, R1-110496, 3$^{rd}$ Generation Partnership Project, Valbonne, France (Jan. 17-21, 2011).

"Further design considerations for UL MIMO," 3GPP TSG RAN WG1 Meeting #66, Athens, Greece, R1-112279, 3$^{rd}$ Generation Partnership Project, Valbonne, France (Aug. 22-26, 2011).

Office Action in corresponding Japanese Patent Application No. 2015-235227 (dated Nov. 1, 2016).

Indian Office Action corresponding to Patent Application No. 7153/CHENP/2014, dated Jun. 21, 2018.

\* cited by examiner

METHOD AND USER EQUIPMENT FOR TRANSMITTING DATA

CROSS-REFERENCE TO RELATED APPLICATIONS

This application is a continuation of International Patent Application No. PCT/CN2013/071294, filed on Feb. 2, 2013, which claims priority to Chinese Patent Application No. 201210066413.0, filed on Mar. 14, 2012, and Chinese Patent Application No. 201210349037.6, filed on Sep. 19, 2012, all of which are hereby incorporated by reference in their entireties.

TECHNICAL FIELD

The present invention relates to the communications field, and in particular, to a method and user equipment (User Equipment, "UE" for short) for transmitting data.

BACKGROUND

High-Speed Uplink Packet Access (High-Speed Uplink Packet Access, "HSUPA" for short) is an uplink transmission technology used by Wideband Code Division Multiple Access (Wideband Code Division Multiple Access, "WCDMA" for short), and the basic principle is that a network side adjusts a service grant (Service grant, "SG" for short) of a UE by using a grant, such as an absolute grant (Absolute grant, "AG" for short) or a relative grant (Relative grant, "RG" for short); the UE determines, according to the SG, granted power for sending data, so that the UE may select, from an enhanced dedicated channel transport format combination (Enhanced Dedicated Channel Transport Format Combination, "E-TFC" for short) table, a size of a data block in uplink transmission according to the granted power, maximum power that can be used for transmitting data, and to-be-transmitted data.

Currently, the UE can only use a single stream mode to transmit data, and data transmission efficiency of the single stream mode is low.

Therefore, there exists a need for a suitable solution to improve data transmission efficiency.

SUMMARY

Embodiments of the present invention provide a method and user equipment for transmitting data, so as to select a transmission mode flexibly, and implements efficient data transmission.

According to one aspect, an embodiment of the present invention provides a method for transmitting data, and the method includes: determining indication information used for indicating to a user equipment (UE) to use a dual stream mode to transmit data; and determining, according to the indication information and a transmission mode determining condition, a transmission mode used for transmitting data, where the transmit mode is a single stream mode or the dual stream mode.

According to another aspect, an embodiment of the present invention provides a user equipment, and the user equipment includes: a first determining module, configured to determine indication information used for indicating to the user equipment (UE) to use a dual stream mode to transmit data; and a second determining module, configured to determine, according to the indication information determined by the first determining module and a transmission mode determining condition, a transmission mode used for transmitting data, where the transmission mode is a single stream mode or the dual stream mode.

According to still another aspect, a method for transmitting data is provided, and the method includes: receiving first information sent by a network side, where the first information is information indicative of performing a serving cell handover or information indicative of switching to a state of being under grant control of a secondary E-RNTI; and setting, according to the first information, transmission mode indication information which is indicative of using a single stream mode to transmit data.

According to yet another aspect, a user equipment is provided, which includes: a receiving module, configured to receive first information sent by a network side, where the first information is information indicative of performing a serving cell handover or information indicative of switching to a state of being under grant control of a secondary E-RNTI; and a setting module, configured to set, according to the first information, transmission mode indication information indicative of using a single stream mode to transmit data.

Based on the foregoing technical solutions, the method and user equipment for transmitting data in the embodiments of the present invention provide the flexibility of selecting a transmission mode based on a transmission mode determining condition, and may implement data transmission at higher efficiency by combining advantages of the dual stream mode and the single stream mode.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as a Global System for Mobile Communications (Global System for Mobile communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short) system, a Long Term Evolution (Long Term Evolution, "LTE" for short) system, an LTE Frequency Division Duplex (Frequency Division Duplex, "FDD" for short) system, LTE Time Division Duplex (Time Division Duplex, "TDD" for short) system, and a Universal Mobile Telecommunications System (Universal Mobile Telecommunications System, "UMTS" for short).

A user equipment (User Equipment, "UE" for short), which may also be called a mobile terminal (Mobile Terminal), a mobile user equipment, and the like, may communicate with one or more core networks through a wireless access network (for example, Radio Access Network, "RAN" for short). The user equipment may be a mobile terminal, such as a mobile phone (or called a "cellular" phone) and a computer having a mobile terminal; for example, the user equipment may be a portable mobile apparatus, a pocket-sized mobile apparatus, a handheld mobile apparatus, a built-in mobile apparatus of a computer, or a vehicle-mounted mobile apparatus, which exchanges languages and/or data with the radio access network.

Figure 1:
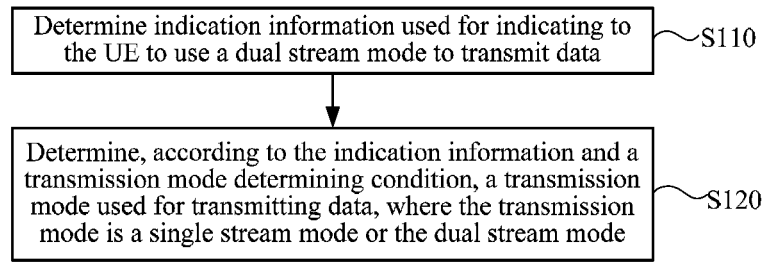
FIG. 1 shows a schematic flowchart of a method for transmitting data according to an embodiment of the present invention.

FIG. 1 is a schematic flowchart of a method 100 for transmitting data according to an embodiment of the present invention, and the method 100 may be executed by a UE. As shown in FIG. 1, the method 100 includes:

S110: Determine indication information used for indicating to the UE to use a dual stream mode to transmit data.

S120: Determine, according to the indication information and a transmission mode determining condition, a transmission mode used for transmitting data, where the transmission mode is a single stream mode or the dual stream mode.

Therefore, according to the method for transmitting data in this embodiment of the present invention, a transmission mode is flexibly selected based on a transmission mode determining condition, and data transmission can be implemented at higher efficiency by combining advantages of the dual stream mode and the single stream mode.

A network side may send, to the UE, the indication information used for indicating to the UE to use the dual stream mode or the single stream mode, where the indication information may be rank information, and may also be represented by other information, for example, may be represented by grant control information that is sent to the UE and includes a special grant value (for example, 0) of a secondary stream in the dual stream mode, and may also be represented by other implicit channel features used for controlling transmission of a primary and/or secondary stream, for example, when a channel format which is granted by the primary stream and/or the secondary stream and sent by the network side is a format 1, it indicates that the UE is controlled to perform single stream transmission, and when a channel format which is granted by the primary stream and/or the secondary stream and sent by the network side is a format 2, it indicates that the UE is controlled to perform dual stream transmission; after the UE receives the indication information sent by the network side, if the indication information is used for indicating to the UE to use the single stream mode to transmit data, the UE may use the single stream mode to transmit data, and if the indication information is used for indicating to the UE to use the dual stream mode to transmit data, the UE may determine, according to a transmission mode determining condition, to use the single stream mode or the dual stream mode to transmit data. The network side may send a piece of indication information for each transmission time interval (Transmission Time Interval, "TTI" for short), so as to notify the UE of a transmission mode used for transmitting data in the corresponding TTI, and may also send a piece of indication information for a plurality of TTIs, so as to notify the UE of a transmission mode used for transmitting data in the corresponding TTIs. Which of the two options is in use should be determined according to an actual need, and is not limited in this embodiment of the present invention.

In this embodiment of the present invention, the determining a transmission mode used for transmitting data in S120 may include:

determining, according to the indication information and the transmission mode determining condition, the transmission mode used for transmitting data, where the transmission mode determining condition is set according to at least one of the following: maximum power that can be used for transmitting data, to-be-transmitted data, a size of a minimum data block corresponding to a code channel combination used for transmitting data in the dual stream mode, power required for transmitting the minimum data block corresponding to the code channel combination, power corresponding to a non-scheduling SG, power corresponding to an SG of a primary stream and power corresponding to an SG of a secondary stream, a minimum transport format combination, an activated state of a primary and/or secondary stream process, and a state in which a secondary stream process is not allowed to perform data transmission.

For example, the transmission mode determining condition may be a critical value of the maximum power that can be used for transmitting data; when the maximum power that can be used for transmitting data is greater than or equal to the critical value, the dual stream mode may be used for transmitting data, and when the maximum power that can be used for transmitting data is less than the critical value, the single stream mode may be used for transmitting data; for another example, a corresponding relationship between a ratio of power corresponding to an SG of the primary stream to power corresponding to an SG of the secondary stream and both the single stream mode and the dual stream mode may be set as the transmission mode determining condition; for another example, when the to-be-transmitted data includes two retransmission data blocks, the transmission mode determining condition may be set as sending the two retransmission data blocks according to the dual stream mode.

In this embodiment of the present invention, the transmission mode determining condition may further be set according to other factors, which are not limited in this embodiment of the present invention.

In this embodiment of the present invention, the maximum power that can be used for transmitting data is maximum transmit power of the UE minus power used for sending a physical control channel (Physical Control Channel, "PCCH" for short), where the PCCH may include one or a combination of a dedicated physical control channel (Dedicated Physical Control Channel, "DPCCH" for short), a secondary dedicated physical control channel (Secondary Dedicated Physical Control Channel, "S-DPCCH" for short), an enhanced dedicated physical control channel (Enhanced Dedicated Physical Control Channel, "E-DPCCH" for short), and a secondary enhanced dedicated physical control channel (Secondary Enhanced Dedicated Physical Control Channel, "S-E-DPCCH" for short); in this embodiment of the present invention, the code channel combination used for transmitting data in the dual stream mode is a specified code channel combination used for transmitting data in the dual stream mode. For example, (2*SF2+2*SF4) may be used, which is a combination of two code channels with a spreading factor (Spreading Factor, "SF" for short) of 2 and two code channels with a spreading factor of 4. Apparently, the code channel combination may be any portion of the 2*SF2+2*SF4, such as SF2+SF4 or SF2; when the code channel combination is used for transmitting data, some data blocks may be used, where a data block with a minimum data size is the minimum data block corresponding to the code channel combination. In this embodiment of the present invention, when a non-scheduling SG exists, an SG of the primary stream includes a scheduled SG of the primary stream and a non-scheduling SG of the primary stream, and the power corresponding to the SG of the primary stream may include power corresponding to the scheduled SG of the primary stream and power corresponding to the non-scheduling SG of the primary stream, where the power corresponding to the SG of the primary stream is obtained by multiplying the power used on a DPCCH by the SG of the primary stream, and the power corresponding to the SG of the secondary stream is obtained by multiplying the power used on a DPCCH by the SG of the secondary stream. In this embodiment of the present invention, the to-be-transmitted data is a sum of data of a highest-priority media access control (Media Access Control, "MAC" for short)-d stream whose data size is not zero, and data of a MAC-d stream that can be multiplexed with the data of the highest-priority MAC-d stream in a same TTI for transmission, where the to-be-transmitted data may only include new transmission data, and may also include a new transmission data block and a retransmission data block, and may also include two retransmission data blocks.

In this embodiment of the present invention, the determining a transmission mode used for transmitting data in S120 may include:

when any condition included in the transmission mode determining condition is satisfied, determining the transmission mode to be the single stream mode, where the transmission mode determining condition includes at least one of the following conditions:

(1) a transport block selected by the primary stream is less than or equal to any transport block corresponding to a minimum transport block set, where the minimum transport block set is a minimum transport block set configured by the network side for the UE, and even if transmit power calculated by the UE is not enough, the UE may still use a transport block in this set to send data;

(2) a current secondary stream process is forbidden to perform data transmission; and (3) a current secondary stream process is in deactivated state.

In this embodiment of the present invention, when the transmission mode determining condition includes the condition (2), the determining a transmission mode used for transmitting data in S120 may include:

determining, according to process configuration information sent by the network side, whether the current secondary stream process is forbidden to perform data transmission, where the process configuration information includes data transmission information of a primary stream process and/or data transmission information of the secondary stream process.

In this embodiment of the present invention, data transmission information of a secondary stream process may be a bitmap list indicative of whether each secondary stream process is allowed to perform transmission, where the list may be used for indicating transmission states of all secondary stream processes, that is, whether the secondary stream processes are forbidden to perform data transmission, and the UE may determine, according to the list, whether a current secondary stream process is forbidden to perform data transmission; if the current secondary stream process is forbidden to perform data transmission, it may be determined that the mode used for transmitting data is the single stream mode.

In this embodiment of the present invention, data transmission information of a primary stream process may be a list of processes that may perform non-scheduled data transmission and processes that may perform scheduled data transmission. For example, the network side configures a bitmap for the UE, the bitmap has 8 bits, for example, [10010101], and each bit indicates whether a specific process is allowed to perform data transmission, for example, 1 indicates that a process is allowed to perform data transmission, and 0 indicates that a process is not allowed to perform data transmission.

In this embodiment of the present invention, a bit list (a specific type of data transmission information of a primary stream process) may further be separately set for indicating whether a process is allowed to perform scheduled data transmission and/or whether a process is allowed to perform scheduled data transmission. In this embodiment of the present invention, there may be cases that some primary stream processes are neither allowed to perform scheduled data transmission, nor allowed to perform non-scheduled data transmission; some primary stream processes are allowed to perform both scheduled data transmission and non-scheduled data transmission; and some primary stream processes are only allowed to perform scheduled data transmission or non-scheduled data transmission. Therefore, in this embodiment of the present invention, the primary stream processes allowed to perform scheduled data transmission include primary stream processes only allowed to perform scheduled data transmission, primary stream processes only allowed to perform non-scheduled data transmission, and primary stream processes allowed to perform both scheduled data transmission and non-scheduled data transmission.

In this embodiment of the present invention, the UE may determine, according to data transmission information of primary stream processes, data transmission information of a current primary stream process paired with a current secondary stream process, for example, whether data transmission is allowed, whether scheduled data transmission is allowed, or whether non-scheduled data transmission is allowed; then, the UE may determine, according to the data transmission information of the current primary stream process paired with the current secondary stream process, whether the current secondary stream process is forbidden to perform data transmission.

In this embodiment of the present invention, when determining that the current primary stream process is allowed to perform data transmission, the UE may determine that the current secondary stream process is not forbidden to perform data transmission; or, when determining that the current primary stream process is allowed to perform scheduled data transmission, the UE may determine that the current secondary stream process is not forbidden to perform data transmission; or, when determining that the current primary stream process is only allowed to perform non-scheduled data transmission, the UE may determine whether there is an indication that is configured by a network to allow the secondary stream process to send data, and when such an indication exists, the UE determines that the current secondary stream process is not forbidden to perform data transmission.

For clearer understanding of the foregoing embodiment, the following explains a concept of a process and a concept of process pairing in dual stream transmission.

In single stream transmission, a maximum of 8 hybrid automatic repeat request (Hybrid Automatic Repeat Request, "HARQ" for short) processes may be configured in the uplink, and each TTI uses one of the processes to perform data transmission. In dual stream transmission, a maximum of two processes may be sent in each TTI. The number of processes used by the secondary stream is the same as the number of processes used by the primary stream, for example, if the primary stream uses 8 processes, the secondary stream also uses 8 processes; it is assumed that process numbers of the primary stream are 0 to 7, and process numbers of the secondary stream are 8 to 15. In each TTI, the primary stream may select and use a process, and the secondary stream may also select and use a process. Processes that are selected by the UE for the primary stream and the second stream in a same TTI are referred to as pairing processes. For example, if a process 1 is selected for the primary stream and a process 9 is selected for the secondary stream, the process 1 and the process 9 are pairing processes. A process pairing relationship is determined after process numbers are allocated.

In this embodiment of the present invention, when the transmission mode determining condition includes the condition (3), before the determining a transmission mode used for transmitting data in S120, the method 100 may further include:

determining to switch to a state of being under grant control of a secondary enhanced radio network temporary identity (Enhanced Radio Network Temporary Identity, "E-RNTI" for short), and setting all the secondary stream processes to a deactivated state.

In this embodiment of the present invention, the determining to switch to a state of being under grant control of a secondary E-RNTI may include:

when an indication that is sent by the network side by using a primary E-RNTI and is indicative of deactivating all processes is received and it is determined that the secondary E-RNTI is configured, determining to switch to the state of being under grant control of the secondary E-RNTI.

Specifically, when the network side sends, by using the primary E-RNTI, the indication of deactivating all processes to the UE and the UE configures the secondary E-RNTI, the UE considers that the deactivation command is a command of switching to the secondary E-RNTI, sets a primary E-RNTI grant state to false according to this command, switches to be under grant control of the secondary E-RNTI, activates all primary stream processes, and deactivates all secondary stream processes. Apparently, in this case, the UE may also directly set the indication information as indicating to the UE to use the single stream mode to perform data transmission.

In this embodiment of the present invention, when the transmission mode determining condition includes the condition (3), before the determining a transmission mode used for transmitting data in S120, the method 100 may further include:

receiving a grant command that is sent by the network side by using the primary E-RNTI; and when the grant command that is sent by the network side by using the primary E-RNTI is not an indication of deactivating all processes and the primary E-RNTI grant state is false, setting all the secondary stream processes to an activated state; apparently, in this case, the indication information may be directly set as indicating to the UE to use the dual stream mode to perform data transmission.

Because the primary E-RNTI controls a single UE, and the secondary E-RNTI controls a group of UEs, when the UE switches to the state of being under grant control of the secondary E-RNTI, the UE deactivates all the secondary stream processes, which means that the single stream mode is used to transmit data, so that when the network side controls a group of UEs by using the secondary E-RNTI, the group of UEs all use the single stream mode, thereby better predicting an interference situation.

In this embodiment of the present invention, the method 100 may further include:

determining that the to-be-transmitted data only includes new transmission data; and correspondingly, the determining a transmission mode for transmitting data in S120 may include:

when any condition included in the transmission mode determining condition is satisfied, determining the transmission mode to be the single stream mode, where the transmission mode determining condition includes at least one of the following conditions:

(4) the maximum power that can be used for transmitting data is less than twice of the power corresponding to the non-scheduling SG;

(5) the maximum power that can be used for transmitting data is less than twice of the power required for transmitting the minimum data block corresponding to the code channel combination;

(6) the maximum power that can be used for transmitting data is less than twice of the power required for transmitting the minimum data block corresponding to the code channel combination plus twice of a primary and/or secondary stream power offset, where the primary and/or secondary stream power offset is specifically a difference between power used by the primary stream for transmitting data and power used by the secondary stream for E-TFC selection; the power offset may be obtained by subtracting the power corresponding to the SG of the secondary stream from the power corresponding to the SG of the primary stream, may be a primary and/or secondary stream power offset delivered by the network side, or may be calculated according to a parameter which is delivered by the network side and is used for calculating the primary and/or secondary stream power offset; in this embodiment of the present invention, when the network side delivers the power offset, the UE may determine the power corresponding to the SG of the secondary stream and the SG of the secondary stream according to the power corresponding to the scheduled SG of the primary stream and the power offset;

(7) the power corresponding to the SG of the secondary stream is less than the power required for transmitting the minimum data block corresponding to the code channel combination;

(8) a size of the to-be-transmitted data is less than twice of the size of the minimum data block corresponding to the code channel combination; and (9) a size of the to-be-transmitted data is less than the size of the minimum data block corresponding to the code channel combination plus the smaller of a size of a data block corresponding to half of the maximum power that can be used for transmitting data and a size of a data block that can be transmitted by using the power corresponding to the SG of the primary stream.

When none of conditions included in the transmission mode determining condition is satisfied, the transmission mode may be determined to be the dual stream mode, and in this case, the transmission mode determining condition may only include conditions (4), (5), (6), (7), (8), and (9), and may also include conditions (1), (2), and (3). Apparently, besides the foregoing conditions, other factors, if exist, may also be taken into consideration when it is determined whether the transmission mode is the dual stream mode, which is not limited in this embodiment of the present invention.

According to the condition (4), it may be determined whether the maximum power that can be used for transmitting data satisfies a power demand in a case where the power corresponding to the non-scheduling SG is determined as minimum transmit power of the primary stream and secondary stream in the dual stream mode; according to the condition (5), it may be determined whether the maximum power that can be used for transmitting data satisfies a power demand for transmitting data in the dual stream mode; according to the condition (6), it may be determined whether the maximum power that can be used for transmitting data satisfies a power demand in a case where power required for transmitting data blocks in the dual stream mode is different and the primary stream and the secondary stream use same transmit power; according to the condition (7), it may be determined whether granted power satisfies a power demand for transmitting data in the dual stream mode; according to the condition (8), it may be determined whether the to-be-transmitted data satisfies a requirement that the code channel combination corresponding to the dual stream mode places on a size of a transmitted data block; and according to the condition (9), it may be determined whether the size of the to-be-transmitted data satisfies a data volume demand in a case where the size of the data block transmitted in the primary stream is determined according to the smaller of half of the maximum power that can be used for transmitting data and the power corresponding to the SG of the primary stream.

It should be understood that, the foregoing conditions (1), (2), (3), (4), (5), (6), (7), (8), and (9) are merely examples in this embodiment of the present invention, and other conditions may further be set in this embodiment of the present invention, which are not limited in this embodiment of the present invention. For example, the condition (1) may be changed to that the maximum power that can be used for transmitting data is less than 2.1 times of the power corresponding to the non-scheduling SG. It should be further understood that, the transmission mode determining condition may include all of the conditions (1), (2), (3), (4), (5), (6), (7), (8), and (9), and may also include a part of the conditions (1), (2), (3), (4), (5), (6), (7), (8), and (9), which should be determined according to an actual need, and is not limited in this embodiment of the present invention.

In this embodiment of the present invention, the method 100 may further include:

determining that the to-be-transmitted data includes a retransmission data block, where a data block that needs to be retransmitted may be determined according to a NACK response received from the network side.

The determining a transmission mode for transmitting data in S120 includes:

when any condition included in the transmission mode determining condition is satisfied, determining the transmission mode to be the single stream mode, where the transmission mode determining condition includes at least one of the following conditions:

(10) the maximum power that can be used for transmitting data is less than twice of power used for transmitting the retransmission data block for the first time;

(11) the power used for transmitting the retransmission data block for the first time is greater than the power corresponding to the SG of the primary stream;

(12) a size of new transmission data included in the to-be-transmitted data is less than the size of the minimum data block corresponding to the code channel combination; and

(13) a size of the retransmission data block is less than the size of the minimum data block corresponding to the code channel combination.

When none of the conditions included in the transmission mode determining condition is satisfied, the transmission mode is determined to be the dual stream mode. In this case, the transmission mode determining condition may only include the conditions (11), (12), (13), (7), (8), and (9), and may also include the conditions (1), (2), and (3). Apparently, the transmission mode determining condition may also include other conditions. Apparently, besides the foregoing conditions, other factors, if exist, may also be taken into consideration when it is determined whether the transmission mode is the dual stream mode, which is not limited in this embodiment of the present invention.

According to the condition (10), it may be determined whether the maximum power which can be used by the UE for transmitting data satisfies the transmit power demand when the power used for transmitting the retransmission data block for the first time is used as the transmit power of the primary stream and secondary stream in the dual stream mode; according to the condition (11), it may be determined whether power greater than the granted power is used for transmitting new transmission data when new transmission data is transmitted in the secondary stream and the maximum power used for transmitting the retransmission data block for the first time is selected as the transmit power of the primary stream and secondary stream; according to the condition (12), it is determined whether the size of new transmission data satisfies a requirement that the code channel combination used in the dual stream mode places on a data block size; and according to the condition (13), it may be determined whether the size of the retransmission data block satisfies a requirement that the code channel combination used in the dual stream mode places on a data block size.

It should be understood that, the foregoing used conditions (10), (11), (12), and (13) are merely examples in this embodiment of the present invention, which is not limited in this embodiment of the present invention. It should be further understood that, the transmission mode determining condition may include all of the conditions (1), (2), (3), (10), (11), (12), and (13), and may also include a part of the conditions (1), (2), (3), (10), (11), (12), and (13), which should be determined according to an actual need, and is not limited in this embodiment of the present invention.

Figure 2:
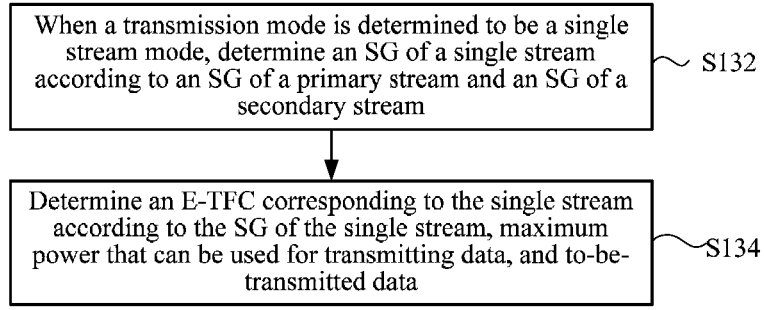
FIG. 2 shows a schematic flowchart of a method for transmitting data according to another embodiment of the present invention.

In an embodiment of the present invention, as shown in FIG. 2, the method 100 may further include:

S132: When the transmission mode is determined to be the single stream mode, determine an SG of a single stream according to the SG of the primary stream and the SG of the secondary stream.

For example, a sum of the SG of the primary stream and the SG of the secondary stream may be determined as the SG of the single stream, or SG0 may be obtained according to a formula SG0=(SG of the primary stream*DPCCH+SG of the secondary stream*DPCCH+power of a secondary stream control channel)/DPCCH, then the SG of the single stream is obtained from an SG table according to SG0, and the SG of the single stream may be a maximum SG in a set of SGs which are in the SG table and less than SG0; the secondary stream control channel may include an S-DPCCH and/or an S-E-DPCCH.

S134: Determine an E-TFC corresponding to the single stream according to the SG of the single stream, the maximum power that can be used for transmitting data, and the to-be-transmitted data.

For example, power corresponding to the SG of the single stream may be obtained according to the SG of the single stream, and thereby smaller power among the maximum power that can be used for transmitting data and the power corresponding to the SG of the single stream may be determined; in an E-TFC table, a corresponding data block set is obtained from a set by power less than or equal to the smaller power, and a data block less than or equal to the to-be-transmitted data is selected from the data block set; the selected data block may be determined as a transport block of the single stream, and power corresponding to the selected data block is determined to be transmit power of the single stream.

Figure 3:
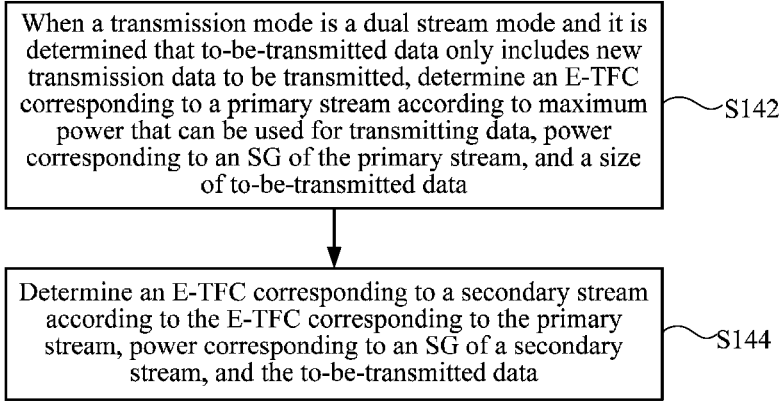
FIG. 3 shows a schematic flowchart of a method for transmitting data according to another embodiment of the present invention.

In an embodiment of the present invention, as shown in FIG. 3, the method 100 may further include:

S142: When the transmission mode is the dual stream mode and it is determined that the to-be-transmitted data only includes new transmission data to be transmitted, determine an E-TFC corresponding to the primary stream according to the maximum power that can be used for transmitting data, the power corresponding to the SG of the primary stream, and the size of the to-be-transmitted data.

For example, a data block that can be transmitted may be obtained from the E-TFC table according to half of the maximum power that can be used for transmitting data, the power corresponding to the SG of the primary stream, and the size of the to-be-transmitted data; and power corresponding to the obtained data block is used as transmit power corresponding to the primary stream.

S144: Determine an E-TFC corresponding to the secondary stream according to the E-TFC corresponding to the primary stream, the power corresponding to the SG of the secondary stream, and the to-be-transmitted data.

For example, a data block that can be used for transmission may be obtained from the E-TFC table according to the transmit power of the primary stream corresponding to the E-TFC corresponding to the primary stream, the power corresponding to the SG of the secondary stream, and a difference between the size of the to-be-transmitted data and a size of a data block corresponding to the E-TFC corresponding to the primary stream; and the transmit power of the primary stream may be determined as the transmit power of the secondary stream, thereby preventing mutual interference between the primary stream and the secondary stream when data is transmitted.

The determining an E-TFC corresponding to the secondary stream in S144 may include:

when the transmit power of the primary stream corresponding to the E-TFC corresponding to the primary stream is less than the power corresponding to the SG of the primary stream, determining the E-TFC corresponding to the secondary stream according to the E-TFC corresponding to the primary stream, the power corresponding to the SG of the primary stream, the power corresponding to the SG of the secondary stream, and the size of the to-be-transmitted data.

For example, an SG available of the secondary stream may be obtained (according to the transmit power of the primary stream/the power corresponding to the SG of the primary stream*the SG of the secondary stream), and then a data block used for secondary stream transmission may be determined according to power corresponding to the available SG of the secondary stream and the size of the to-be-transmitted data—the length of the data block corresponding to the primary stream, where transmit power of the secondary stream may be determined to be the same as the transmit power of the primary stream, so that the primary stream and the secondary stream have the same transmit power, which may prevent mutual interference between the primary stream and the secondary stream when data is transmitted.

Figure 4:
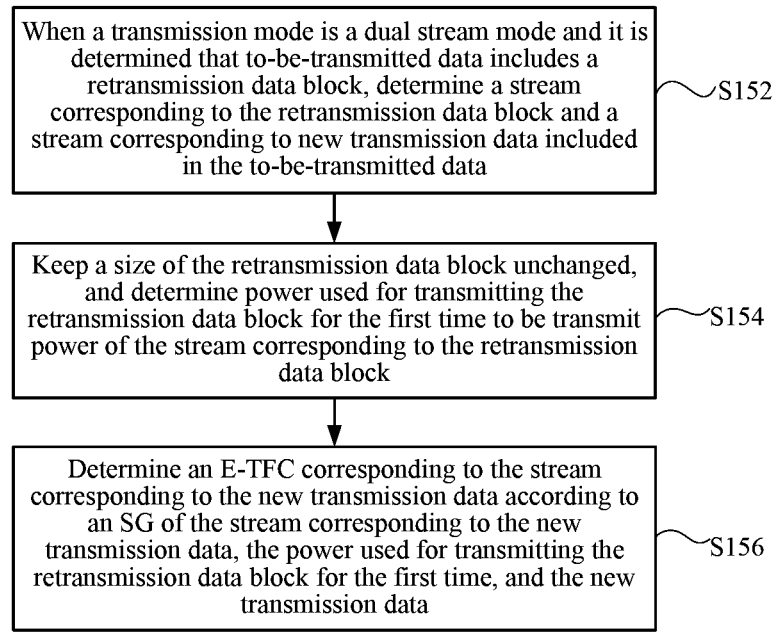
FIG. 4 shows a schematic flowchart of a method for transmitting data according to another embodiment of the present invention.

In an embodiment of the present invention, as shown in FIG. 4, the method 100 may further include:

S152: When the transmission mode is the dual stream mode and it is determined that the to-be-transmitted data includes a retransmission data block, determine a stream corresponding to the retransmission data block and a stream corresponding to new transmission data included in the to-be-transmitted data.

For example, when a stream corresponding to the retransmission data block that is transmitted for the first time is the primary stream, the primary stream may be determined as the stream corresponding to the retransmission data block in the current transmission, and the secondary stream is determined as the stream corresponding to new transmission data; when a stream corresponding to the retransmission data block that is transmitted for the first time is the single stream, the primary stream may be determined as the stream corresponding to the retransmission data block in the current transmission, and the secondary stream is determined as the stream corresponding to new transmission data.

S154: Keep the size of the retransmission data block unchanged, and determine the power used for transmitting the retransmission data block for the first time to be transmit power of the stream corresponding to the retransmission data block.

S156: Determine an E-TFC corresponding to the stream corresponding to the new transmission data according to an SG of the stream corresponding to the new transmission data, the power used for transmitting the retransmission data block for the first time, and the new transmission data.

If the retransmission data block is in the secondary stream, and the new transmission data is in the primary stream, the primary stream selects an E-TFC by using the power used for transmitting the retransmission data block for the first time, the power corresponding to the SG of the primary stream, and the size of the new transmission data.

If the retransmission data block is in the primary stream, and the new transmission data is in the secondary stream, the determining an E-TFC corresponding to the stream corresponding to the new transmission data in S156 includes:

determining the E-TFC corresponding to the stream corresponding to the new transmission data according to the SG of the primary stream, the SG of the secondary stream, the power used for transmitting the retransmission data block for the first time, and the new transmission data to be transmitted.

For example, the E-TFC is selected according to a result of the calculation: the SG of the secondary stream/the SG of the primary stream*the power used for transmitting the retransmission data block for the first time, the power corresponding to the SG of the secondary stream, and the size of the new transmission data, so as to select the data block corresponding to the secondary stream, where the transmit power of the secondary stream may be determined to be the same as the transmit power of the primary stream.

In this embodiment of the present invention, if the to-be-transmitted data includes two retransmission data blocks, the two retransmission data blocks may be transmitted according to power used for transmitting the two retransmission data blocks for the first time.

Figure 5:
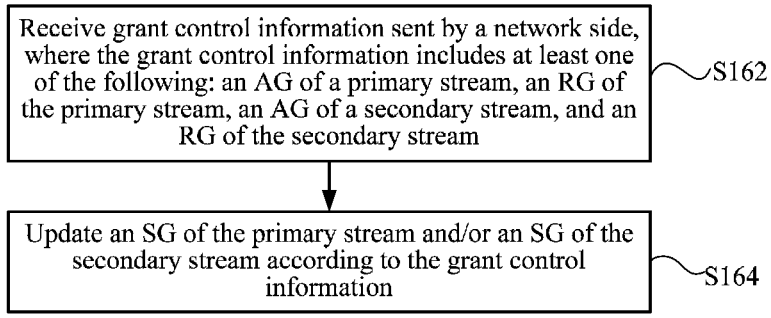
FIG. 5 shows a schematic flowchart of a method for transmitting data according to another embodiment of the present invention.

In an embodiment of the present invention, as shown in FIG. 5, the method 100 may further include:

S162: Receive grant control information sent by the network side, where the grant control information includes at least one of the following: an AG of the primary stream, an RG of the primary stream, an AG of the secondary stream, and an RG of the secondary stream.

S164: Update the SG of the primary stream and/or the SG of the secondary stream according to the grant control information.

If the grant control information includes the AG of the primary stream, it may be set that a value corresponding to the SG of the primary stream is a value of the AG; if the grant control information includes the RG, the SG may be relatively changed based on the current SG; if the grant control information includes the RG of the primary stream and does not include the AG of the primary stream, the SG of the primary stream may be relatively changed based on the current SG of the primary stream.

If the grant control information includes the AG, the SG of the secondary stream may be directly set.

In this embodiment of the present invention, the receiving grant control information sent by the network side in S162 may include:

receiving the grant control information that includes the RG of the secondary stream and is sent by the network side.

Correspondingly, the updating the SG of the primary stream and/or the SG of the secondary stream according to the grant control information in S164 may include:

updating the SG of the secondary stream according to the SG of the primary stream and a value indicated by the RG of the secondary stream.

That is, when the grant control information includes the value indicated by the RG of the secondary stream, the SG of the secondary stream may be relatively changed based on the SG of the primary stream, for example, the SG of the secondary stream may be changed according to the following table:

TABLE 1

| Execute | Value of RG |
|---|---|
| Update the SG of the secondary stream to be one level lower than the SG of the primary stream | +1 |
| Update the SG of the secondary stream to be two level lower than the SG of the primary stream | 0 |
| Update the SG of the secondary stream to be three level lower than the SG of the primary stream | −1 |

As shown in Table 1, when a value of the received RG is +1, the SG of the secondary stream is updated to be a value that descends by one level relative to the primary stream, and the number of SG grids corresponding to one level may be set to be a default value or be indicated with coordination of other physical channels. For example, one bit is added on an F-TPICH (a precoding feedback channel) channel; when the bit is 0, it indicates lowering by one grid once, and when the bit is 1, it indicates lowering by two grids once. For example, one level is corresponding to one SG grid, and if a value of the received RG is +1, it indicates that the SG of the secondary stream is updated to be the SG of the primary stream minus 1. It should be understood that, the specific number of lowered levels corresponding to the value of the RG and the number of SG grids corresponding to one level may be determined according to an actual need.

Therefore, according to the method for transmitting data in this embodiment of the present invention, a transmission mode is flexibly selected based on a transmission mode determining condition, and data transmission can be implemented at higher efficiency by combining advantages of the dual stream mode and the single stream mode.

Figure 6:
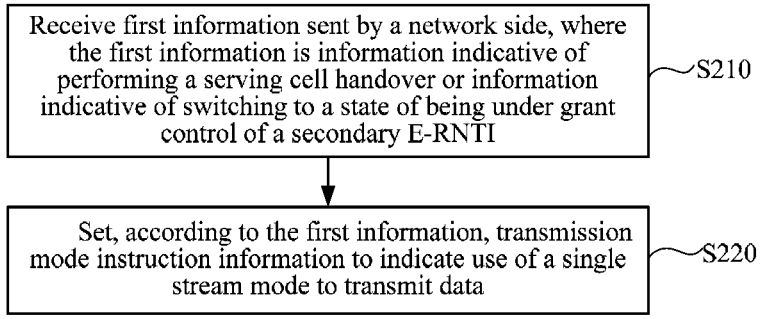
FIG. 6 shows a schematic flowchart of a method for transmitting data according to another embodiment of the present invention.

FIG. 6 is a schematic block diagram of a method 200 for transmitting data according to another embodiment of the present invention. As shown in FIG. 6, the method 200 includes:

S210: Receive first information sent by a network side, where the first information is information indicative of performing a serving cell handover or information indicative of switching to a state of being under grant control of a secondary E-RNTI.

S220: Set, according to the first information, transmission mode indication information indicative of using a single stream mode to transmit data.

Specifically, after receiving the information that is sent by the network side and indicative of performing a serving cell handover or indicative of switching to the state of being under grant control of the secondary E-RNTI, the user equipment may set the transmission mode indication information stored in the user equipment to be indicative of using the single stream mode to transmit data.

In this embodiment of the present invention, the setting the transmission mode indication information stored in the user equipment to be indicative of using the single stream mode to transmit data may be:

if the transmission mode indication information is already indicative of using the single stream mode to transmit data, keeping the transmission mode indication information unchanged; and if the transmission mode indication information is indicative of using a dual stream mode to transmit data, modifying the transmission mode indication information to be indicative of using the single stream mode to transmit data.

In this embodiment of the present invention, when the first information is the information indicative of performing a serving cell handover, the serving cell handover indicated by the first information is a serving cell handover between base stations or a serving cell handover between radio link sets. That is, further, the user equipment may modify the transmission mode indication information to be indicative of using the single stream mode to transmit data, only when the information that is sent by the network side and is indicative of performing a serving cell handover between base stations or a serving cell handover between radio link sets is received, and when the transmission mode is originally indicative of using the dual stream mode to transmit data; otherwise, the transmission mode indication information remains unchanged.

In this embodiment of the present invention, when the first information is the information indicative of switching to the state of being under grant control of the secondary E-RNTI, the information indicative of switching to the state of being under grant control of the secondary E-RNTI is indication information that is indicative of deactivating all processes and sent by the network side by using a primary E-RNTI when the secondary E-RNTI is configured.

Specifically, when the network side sends, by using the primary E-RNTI, the indication information of deactivating all processes to the UE, and the UE configures the secondary E-RNTI, the UE considers the information to be information indicative of switching to the state of being under grant control of the secondary E-RNTI; therefore, the UE sets a primary E-RNTI grant state to false according to this information, switches to the state of being under grant control of the secondary E-RNTI, and sets the transmission mode indication information to be indicative of using the single stream mode to transmit data.

In this embodiment of the present invention, the transmission mode indication information may be rank information. After the UE receives uplink multiple-input multiple-output (Multiple-Input Multiple-Output, "MIMO" for short) configuration information, the UE may initialize the rank information to be information used for indicating to the UE to use the single stream mode to transmit data. Subsequently, the UE may determine, according to the information sent by the network side, whether to modify the rank information or keep the rank information unchanged.

Therefore, in this embodiment of the present invention, when the information that is indicative of performing a serving cell handover and sent by the network side is received, the transmission mode indication information is set to indicate use of the single stream mode to transmit data, so that the UE can use the single stream mode when being handed over to a new cell, thereby avoiding strong interference to the new cell; after the information that is indicative of switching to the state of being under grant control of the secondary E-RNTI and sent by the network side is received, the transmission mode indication information is set to indicate use of the single stream mode to transmit data, so that when the network side controls a group of UEs by using the secondary E-RNTI, the group of UEs all use the single stream mode, thereby better predicting an interference situation.

The method for transmitting data according to the embodiments of the present invention is described in the foregoing with reference to FIG. 1 to FIG. 6, and the following describes a UE according to the embodiments of the present invention with reference to FIG. 7 to FIG. 12.

Figure 7:
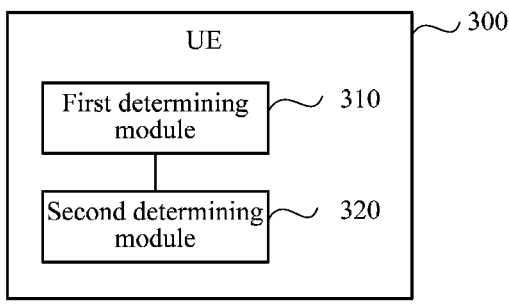
FIG. 7 shows a schematic block diagram of a user equipment according to an embodiment of the present invention.

FIG. 7 shows a schematic block diagram of a UE according to an embodiment of the present invention. As shown in FIG. 7, a UE 300 includes:

a first determining module 310, configured to determine indication information used for indicating to the user equipment (UE) to use a dual stream mode to transmit data; and a second determining module 320, configured to determine, according to the indication information determined by the first determining module 310 and a transmission mode determining condition, a transmission mode used for transmitting data, where the transmission mode is a single stream mode or the dual stream mode.

Therefore, by using the UE in this embodiment of the present invention, a transmission mode is flexibly selected based on a transmission mode determining condition, and data transmission can be implemented at higher efficiency by combining advantages of the dual stream mode and the single stream mode.

Optionally, the second determining module 320 is specifically configured to:

determining, according to the indication information and the transmission mode determining condition, the transmission mode used for transmitting data, where the transmission mode determining condition is set according to at least one of the following: maximum power that can be used for transmitting data, a size of a minimum data block corresponding to a code channel combination used for transmitting data in the dual stream mode, power required for transmitting the minimum data block corresponding to the code channel combination, to-be-transmitted data, power corresponding to a non-scheduled service grant (SG), power corresponding to an SG of a primary stream and power corresponding to an SG of a secondary stream, a minimum transport format combination, an activated state of a primary and/or secondary stream process, and a data transmission state of the secondary stream process.

Optionally, the second determining module 320 is specifically configured to:

when any condition included in the transmission mode determining condition is satisfied, determine the transmission mode to be the single stream mode, where the transmission mode determining condition includes at least one of the following conditions:

a transport block selected by the primary stream is less than or equal to any transport block corresponding to a minimum transport block set;

a current secondary stream process is forbidden to perform data transmission; and a current secondary stream process is in a deactivated state.

Optionally, the transmission mode determining condition includes a condition that the current secondary stream process is in a state of being forbidden to perform data transmission.

Figure 8:
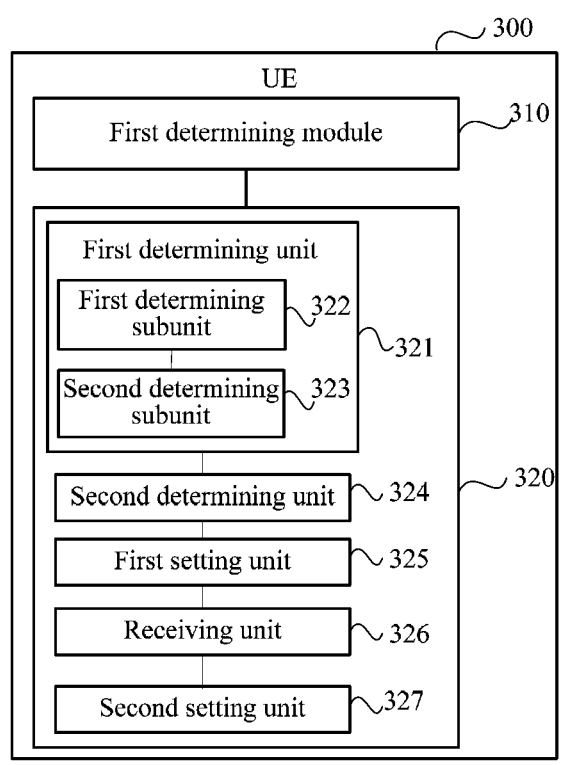
FIG. 8 shows a schematic block diagram of a user equipment according to another embodiment of the present invention.

Correspondingly, as shown in FIG. 8, the second determining module 320 includes:

a first determining unit 321, configured to determine, according to process configuration information sent by a network side, whether the current secondary stream process is forbidden to perform data transmission, where the process configuration information includes data transmission information of the primary stream process and/or data transmission information of the secondary stream process.

Optionally, as shown in FIG. 8, the first determining unit 321 includes:

a first determining subunit 322, configured to determine the data transmission information of a current primary stream process paired with the current secondary stream process according to the data transmission information of the primary stream process; and a second determining subunit 323, configured to determine, according to the data transmission information of the current primary stream process paired with the current secondary stream process, whether the current secondary stream process is forbidden to perform data transmission.

Optionally, the second determining subunit 323 is specifically configured to:

when the current primary stream process is allowed to perform data transmission, determine that the current secondary stream process is not forbidden to perform data transmission; or when the current primary stream process is allowed to perform scheduled data transmission, determine that the current secondary stream process is not forbidden to perform data transmission; or when the current primary stream process is only allowed to perform non-scheduled data transmission, determine whether there is an indication that is configured by a network to allow the secondary stream process to send data, and when such an indication exists, determine that the current secondary stream process is not forbidden to perform data transmission.

Optionally, as shown in FIG. 8, the transmission mode determining condition includes the condition that the current secondary stream process is in the deactivated state, and the second determining module 320 includes:

a second determining unit 324, configured to determine to switch to a state of being under grant control of a secondary E-RNTI; and a first setting unit 325, configured to set all secondary stream processes to the deactivated state.

Optionally, the second determining unit 324 is specifically configured to:

when an indication that is sent by the network side by using a primary E-RNTI and is indicative of deactivating all processes is received, and it is determined that the secondary E-RNTI is configured, determine to switch to the state of being under grant control of the secondary E-RNTI.

Optionally, the transmission mode determining condition includes the condition that the current secondary stream process is in the deactivated state.

Correspondingly, as shown in FIG. 8, the second determining module 320 includes:

a receiving unit 326, configured to receive a grant command that is sent by the network side by using the primary E-RNTI; and a second setting unit 327, configured to: when the grant command that is sent by the network side by using the primary E-RNTI is not an indication of deactivating all processes, and a primary E-RNTI grant state is false, set all the secondary stream processes to an activated state.

Figure 9:
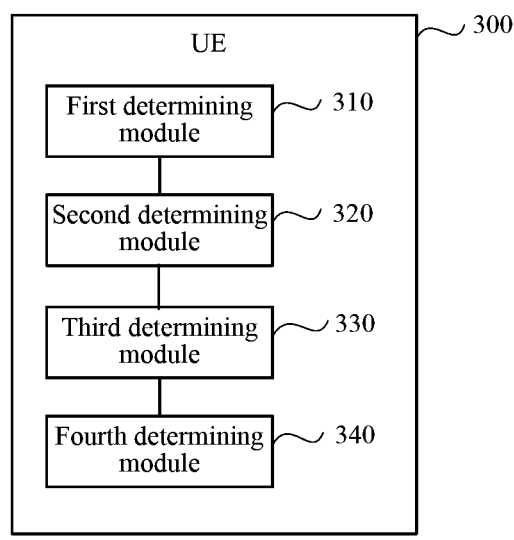
FIG. 9 shows a schematic block diagram of a user equipment according to another embodiment of the present invention.

Optionally, as shown in FIG. 9, a UE 300 further includes:

a third determining module 330, configured to determine that the to-be-transmitted data only includes new transmission data.

The second determining module 320 is specifically configured to:

when any condition included in the transmission mode determining condition is satisfied, determine the transmission mode to be the single stream mode, where the transmission mode determining condition includes at least one of the following conditions:

the maximum power that can be used for transmitting data is less than twice of the power corresponding to the non-scheduling SG, the maximum power that can be used for transmitting data is less than twice of the power required for transmitting the minimum data block corresponding to the code channel combination, the maximum power that can be used for transmitting data is less than twice of the power required for transmitting the minimum data block corresponding to the code channel combination plus twice of a primary and/or secondary stream power offset, the power corresponding to the SG of the secondary stream is less than the power required for transmitting the minimum data block corresponding to the code channel combination, a size of the to-be-transmitted data is less than twice of the size of the minimum data block corresponding to the code channel combination, and a size of the to-be-transmitted data is less than the size of the minimum data block corresponding to the code channel combination plus the smaller of a size of a data block corresponding to half of the maximum power that can be used for transmitting data and a size of a data block that can be transmitted by using the power corresponding to the SG of the primary stream.

Optionally, as shown in FIG. 9, the UE 300 further includes:

a fourth determining module 340, configured to determine that the to-be-transmitted data includes a retransmission data block.

The second determining module 320 is specifically configured to:

when any condition included in the transmission mode determining condition is satisfied, determine the transmission mode to be the single stream mode, where the transmission mode determining condition includes at least one of the following conditions:

the maximum power that can be used for transmitting data is less than twice of power used for transmitting the retransmission data block for the first time, the power used for transmitting the retransmission data block for the first time is greater than the power corresponding to the SG of the primary stream, a size of new transmission data included in the to-be-transmitted data is less than the size of the minimum data block corresponding to the code channel combination, and the size of the retransmission data block is less than the size of the minimum data block corresponding to the code channel combination.

Figure 10:
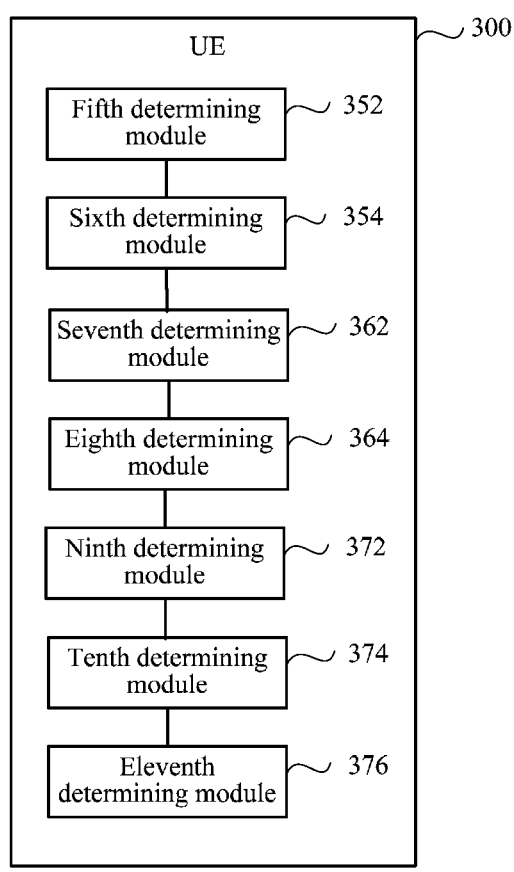
FIG. 10 shows a schematic block diagram of a user equipment according to another embodiment of the present invention.

Optionally, as shown in FIG. 10, the UE 300 further includes:

a fifth determining module 352, configured to: when the transmission mode is the single stream mode, determine an SG of a single stream according to the SG of the primary stream and the SG of the secondary stream; and a sixth determining module 354, configured to determine an enhanced dedicated channel transport format combination (E-TFC) corresponding to the single stream according to the SG of the single stream determined by the fifth determining module 352, the maximum power that can be used for transmitting data, and the to-be-transmitted data.

Optionally, the sixth determining module 354 is specifically configured to:

determine a sum of the SG of the primary stream and the SG of the secondary stream to be the SG of the single stream.

Optionally, as shown in FIG. 10, the UE 300 further includes:

a seventh determining module 362, configured to: when the transmission mode is the dual stream mode and the to-be-transmitted data only includes new transmission data, determine an E-TFC corresponding to the primary stream according to the maximum power that can be used for transmitting data, the power corresponding to the SG of the primary stream, and the to-be-transmitted data; and an eighth determining module 364, configured to determine an E-TFC corresponding to the secondary stream according to the E-TFC corresponding to the primary stream, the power corresponding to the SG of the secondary stream, the to-be-transmitted data, and a data block corresponding to the E-TFC corresponding to the primary stream.

Optionally, the eighth determining module 364 is specifically configured to:

when transmit power of the primary stream corresponding to the E-TFC corresponding to the primary stream is less than the power corresponding to the SG of the primary stream, determine the E-TFC corresponding to the secondary stream according to the E-TFC corresponding to the primary stream, the power corresponding to the SG of the primary stream, the power corresponding to the SG of the secondary stream, and the size of the to-be-transmitted data.

Optionally, as shown in FIG. 10, the UE 300 further includes:

a ninth determining module 372, configured to: when the transmission mode is the dual stream mode and the to-be-transmitted data includes a retransmission data block, determine a stream corresponding to the retransmission data block and a stream corresponding to the new transmission data to be transmitted;

a tenth determining module 374, configured to keep the size of the retransmission data block unchanged, and determine the power used for transmitting the retransmission data block for the first time to be transmit power of the stream corresponding to the retransmission data block; and an eleventh determining module 376, configured to determine an E-TFC corresponding to the stream corresponding to the new transmission data according to an SG of the stream corresponding to the new transmission data, the power used for transmitting the retransmission data block for the first time, and the new transmission data.

Optionally, the eleventh determining module 376 is specifically configured to:

when the stream corresponding to the retransmission data block is the primary stream and the stream corresponding to the new transmission data is the secondary stream, determine the E-TFC corresponding to the stream corresponding to the new transmission data according to the SG of the primary stream, the SG of the secondary stream, the power used for transmitting the retransmission data block for the first time, and the size of the new transmission data.

Optionally, the SG of the primary stream is a sum of the non-scheduling SG and the scheduled SG of the primary stream.

Figure 11:
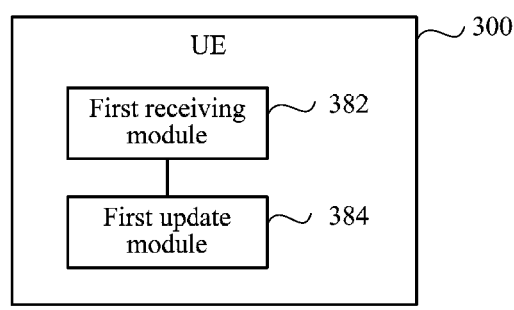
FIG. 11 shows a schematic block diagram of a user equipment according to another embodiment of the present invention.

Optionally, as shown in FIG. 11, the UE 300 further includes:

a first receiving module 382, configured to receive grant control information sent by a network side, where the grant control information includes at least one of the following: an AG of a primary stream, an RG of a primary stream, an AG of a secondary stream, and an RG of a secondary stream; and a first update module 384, configured to update the SG of the primary stream and/or the SG of the secondary stream according to the grant control information received by the first receiving module.

Optionally, the first receiving module 382 is specifically configured to:

receive the grant control information that includes the RG of the secondary stream and is sent by the network side.

The first update module 384 is specifically configured to:

update the SG of the secondary stream according to the SG of the primary stream and a value indicated by the RG of the secondary stream.

The UE 300 in the embodiments of the present invention may be corresponding to the UE in the method 100 in the embodiments of the present invention, and the foregoing other operations and/or functions of the modules in the UE 300 implement corresponding procedures of the method 100 in FIG. 1 to FIG. 5, and details are not described herein again for the purpose of brevity.

Therefore, by using the UE in the embodiments of the present invention, a transmission mode is flexibly selected based on a transmission mode determining condition, and data transmission can be implemented at higher efficiency by combining advantages of the dual stream mode and the single stream mode.

Figure 12:
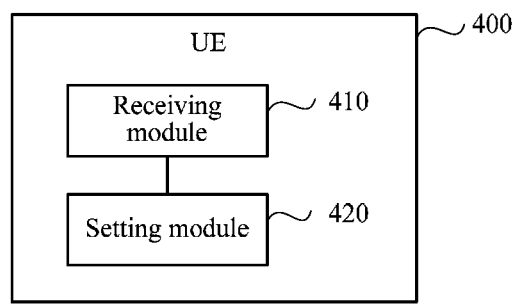
FIG. 12 shows a schematic block diagram of a user equipment according to another embodiment of the present invention.

FIG. 12 is a schematic block diagram of a UE 400 according to an embodiment of the present invention. As shown in FIG. 12, the UE 400 includes:

a receiving module 410, configured to receive first information sent by a network side, where the first information is information indicative of performing a serving cell handover or information indicative of switching to a state of being under grant control of a secondary E-RNTI; and a setting module 420, configured to set, according to the first information, transmission mode indication information which is indicative of using a single stream mode to transmit data.

Optionally, when the first information is the information indicative of performing a serving cell handover, the serving cell handover indicated by the first information is a serving cell handover between base stations or a serving cell handover between radio link sets.

Optionally, when the first information is the information indicative of switching to the state of being under grant control of the secondary E-RNTI, the information indicative of switching to the state of being under grant control of the secondary E-RNTI is indication information that is sent by the network side by using a primary E-RNTI when the secondary E-RNTI is configured and is indicative of deactivating all processes.

Optionally, the receiving module 410 is further configured to receive uplink multiple-input multiple-output configuration information sent by the network side.

The setting module 420 is further configured to initialize, according to the uplink multiple-input multiple-output configuration information, the rank information to be information indicative of using the single stream mode to transmit data.

The UE 400 in this embodiment of the present invention may be corresponding to the UE in the method 200 in the embodiments of the present invention, and the foregoing other operations and/or functions of the modules in the UE 400 implement corresponding procedures of the method 200 in FIG. 6, and details are not described herein again for the purpose of brevity.

Therefore, by using the UE in the embodiments of the present invention, when the information indicative of performing a serving cell handover and sent by the network side is received, the transmission mode indication information is set to indicate use of the single stream mode to transmit data, so that the UE can use the single stream mode when being handed over to a new cell, thereby avoiding strong interference to the new cell; after the information that is indicative of switching to the state of being under grant control of the secondary E-RNTI and sent by the network side is received, the transmission mode indication information is set to indicate use of the single stream mode to transmit data, so that when the network side controls a group of UEs by using the secondary E-RNTI, the group of UEs all use the single stream mode, thereby better predicting an interference situation.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disc, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting data, comprising:
receiving, at a user equipment (UE), uplink multiple-input multiple-output (MIMO) configuration information sent by a network;
initializing, at the UE, according to the uplink MIMO configuration information, rank information to indicate that a single stream mode is used to transmit data;
receiving, at the UE, information sent by a first cell in the network indicative of switching to a state of being under grant control of a secondary enhanced radio network temporary identity (E-RNTI), wherein the information does not include scheduling information for instructing the UE to transition to a single transmission mode during the handover;
transitioning, at the UE, to the single stream mode for transmitting data when the UE receives the information such that the UE is handed over to a second cell in the network without receiving instructions from the network for the transitioning to the single mode, without taking radio conditions into account, without detecting a state of a transmission from the second cell, and regardless of transmission mode indication information at the UE; and
determining, at the UE, according to the information sent by the network side, whether to modify the rank information or keep the rank information unchanged.

2. The method according to claim 1, further comprising:
modifying the transmission mode indication information to indicate that the single stream mode is used to transmit the data, when the transmission mode indication information originally indicates that a dual stream mode is used to transmit the data; or otherwise, keeping the transmission mode indication information which originally indicates that the dual stream mode is used to transmit the data unchanged.

3. The method according to claim 1, wherein setting, according to the information, the transmission mode indication information to indicate that the single stream mode is used to transmit the data comprises:
setting the transmission mode indication information stored in the user equipment to indicate that the single stream mode is used to transmit the data.

4. A user equipment (UE), comprising:
a receiver configured to receive uplink multiple-input multiple-output (MIMO) configuration information sent by a network;
a processor configured to initialize, according to the uplink MIMO configuration information, rank information to indicate that a single stream mode is used to transmit the data;
the receiver further configured to receive information sent by a first cell in the network indicative of switching to a state of being under grant control of a secondary enhanced radio network temporary identity (E-RNTI), wherein the information does not include scheduling information for instructing the UE to transition to a single transmission mode during the handover; and
the processor further configured to transition to the single stream mode for transmitting data when the UE receives the information such that the UE is handed over to a second cell in the network without receiving instructions from the network for the transitioning to the single mode, without taking radio conditions into account, without detecting a state of a transmission from the second cell, and regardless of transmission mode indication information at the UE; and
the processor further configured to determine, according to the information sent by the network side, whether to modify the rank information or keep the rank information unchanged.

5. The UE according to claim 4, wherein the processor is further configured to modify the transmission mode indication information to indicate that the single stream mode is used to transmit the data when the transmission mode indication information originally received indicates using a dual stream mode to transmit the data.

* * * * *